Nov. 17, 1964    G. SCHWIENBACHER    3,157,319
DISPENSER FOR EASILY DRIPPING LIQUIDS
Filed Oct. 11, 1962

United States Patent Office 3,157,319
Patented Nov. 17, 1964

3,157,319
DISPENSER FOR EASILY DRIPPING LIQUIDS
Georges Schwienbacher, Zurich, Switzerland, assignor to Photo-Entwicklungsgerate AG., Zurich, Switzerland
Filed Oct. 11, 1962, Ser. No. 229,933
Claims priority, application Austria, Oct. 12, 1961, A 7,684/61
4 Claims. (Cl. 222—207)

The invention relates to a device for dispensing an easily dripping liquid, said device being of the type having a container which can be deformed in a resiliently yielding manner, with the discharge opening being arranged at the bottom thereof.

In a device of this type the supply of liquid is effected by pressure exerted on the container. The quantity of liquid supplied is compensated as the container recovers its original shape by a corresponding quantity of air. After a balance has been obtained, an afterdripping of liquid through the discharge opening at the bottom of the container must, however, be feared which ceases only after a vacuum has developed in the container. Even then, however, it is still possible for further drops of liquid to find an exit, for instance as a result of variations of temperature or of shocks.

The object of the invention, in general, is to avoid this disadvantage in a dispensing container of the type mentioned and to provide a dispensing container which is safe with respect to afterdripping, particularly for use with photo-copying apparatus in which each of the treating liquid is available in such a dispensing device from which predetermined quantities are dispensed for the treatment of single sheets.

According to the invention the discharge opening of the dispenser is designed so as to form an overflow duct, the upper orifice of which is situated in an enclosed chamber communicating with the container near the bottom thereof.

An embodiment of the invention is diagrammatically illustrated in the accompanying drawings in which—

Figure 1:
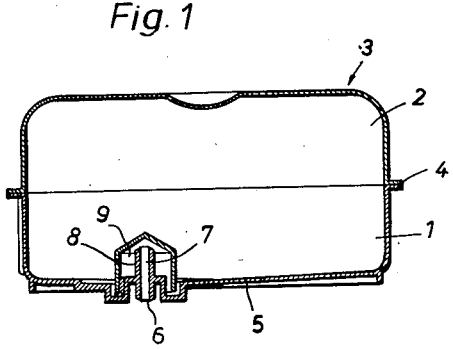
FIGURE 1 is a vertical sectional view of a supply container.
Figure 2:
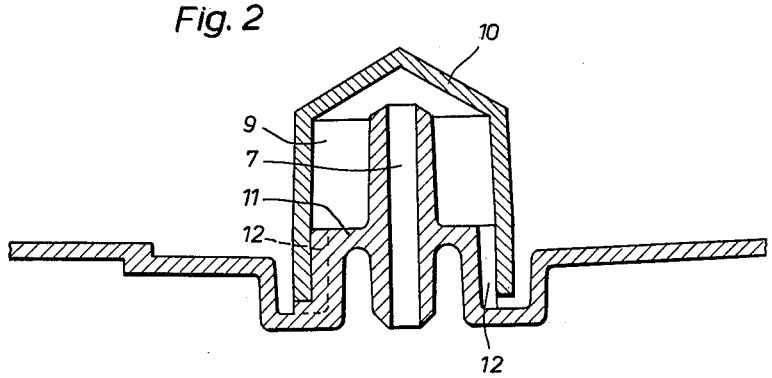
FIGURE 2 is a vertical sectional view of a detail of FIGURE 1 on an enlarged scale.

In the device shown in FIGURE 1, dispensing container 3 comprises a lower portion 1 and an upper portion 2 containing a quantity of liquid, not shown. The two portions 1 and 2 of container 3 are permanently connected with each other as at 4. The upper portion of container 3 is deformable in a resiliently yielding manner in order to supply, by pressure of a finger, a corresponding quantity of enclosed liquid through a discharge opening 6 arranged in bottom 5 of the lower portion 1.

The discharge opening 6 is located at the lower end of an overflow duct 7 provided in a tubular extension 8 which extends upwardly and ends in an enclosed space or chamber 9 formed by a hood 10 together with the bottom 5 of the lower portion. The hood 10 is slipped over a correspondingly shaped support or socket 11 provided on the lower portion 1. Ducts or channels 12 ending near the bottom of the container connect the space 9 with the interior of container 3. Due to the U-shaped design of the ducts 12 the connection proper of the space 9 with the interior of the container is situated not only near the bottom of the container, but even below such bottom, somewhere at the level of the lower orifice of the overflow duct 7.

Now, if pressure is exerted on the upper portion 2 of container 3 to deform the container in a resiliently yielding manner, the liquid available in the container is first displaced through the ducts 12 into the space 9. Upon reaching the upper end of the extension 8 the liquid is allowed to discharge through the overflow duct 7. As soon as the pressure on the upper portion 2 of the container 3 ceases, thus allowing the container to reassume to its original shape, air is drawn into the space 9 through the overflow duct, with the liquid previously displaced into this space flowing back through the ducts 12 into the container 3. Only after the liquid has withdrawn from the ducts 12, can air enter the container 3 for further compensation for the quantity of liquid supplied. After a balance has been obtained, a certain amount of liquid will flow back through the ducts 12 into the space 9, whereby a vacuum is produced in the container 3 which prevents the liquid from overflowing into space 9 before the liquid level might reach the upper end of the overflow pipe 8. Thus, afterdripping subsequent to a discharge or as a result of variations of temperature or of shocks is quite impossible. On the other hand, due to the fact that space 9 is partly filled with liquid, even a slight pressure will suffice to supply the liquid. The invention is not to be confined to any strict conformity to the showings in the drawings but changes or modifications may be made therein so long as such changes or modification mark no material departure from the spirit and scope of the appended claims.

I claim:

1. A container for dispensing easily dripping liquids, comprising top, side and bottom walls constituting a closed body adapted to contain the liquid to be dispensed, at least one of said walls being resiliently deformable, a tubular extension projecting upwardly from said bottom wall and having a duct extending the full length thereof for providing an overflow with the lower end of said duct defining a discharge opening, a hood supported by said bottom wall with its lower end being spaced from said bottom wall, said hood having greater height and width dimensions than said tubular extension and surrounding said tubular extension for providing a relatively large chamber communicating with said overflow, and means providing at least one channel of relative small cross-sectional area with respect to said chamber adjacent said bottom wall for defining a communicating path between said chamber and the interior of the body whereby upon pressure being applied to said at least one resiliently deformable wall, the liquid is displaced through said at least one channel into said chamber and thence through said overflow and discharge opening and upon pressure being relieved on said resiliently deformable wall, such wall re-assumed its original configuration thus drawing air into said chamber via said overflow with the liquid in said chamber through said at least one channel into the body.

2. A container for dispensing easily dripping liquids, comprising top, side and bottom walls constituting a closed body adapted to contain the liquid to be dispensed, at least one of said walls being resiliently deformable, a socket on said bottom wall, a tubular extension traversing said socket and extending upwardly from said socket, said extension having a duct extending the full length thereof for providing an overflow with the lower end of said duct defining a discharge opening, a hood supported by said socket, with its lower end being spaced from said bottom wall, said hood having greater height and width dimensions than said tubular extension and surrounding said tubular extension for providing a relatively large chamber communicating with said overflow, and said socket having a series of channels of relatively small cross-sectional area with respect to said chamber for providing communication between said chamber and the interior of the body whereby upon pressure being applied to said at least one resiliently deformable wall, the liquid is displaced through said channels into said chamber and thence through said overflow and discharge opening and upon pressure being relieved on said resiliently deformable wall, such wall re-assumes its original configuration, thus drawing air into said chamber via said overflow with the liquid in said chamber returning through said channels into the body.

3. A container for dispensing easily dripping liquids, comprising top, side and bottom walls constituting a closed body adapted to contain the liquid to be dispensed, at least one of said walls being resiliently deformable, said bottom wall having a well projecting downwardly therefrom, an upstanding socket on said well, a tubular extension traversing said socket and extending upwardly from said socket, said extension having a duct extending the full length thereof for providing an overflow with the lower end of said duct defining a discharge opening located below said bottom wall, a hood supported by said socket with its lower end being spaced from said well, said hood having greater height and width dimensions than said tubular extension surrounding said tubular extension for providing a relatively large chamber communicating with said overflow, and said socket having a series of channels of relatively small cross-sectional area with respect to said chamber for providing communication between said chamber and the interior of the body whereby upon pressure being applied to said at least one resiliently deformable wall, the liquid is displaced through said channels into said chamber and thence through said overflow and discharge opening and upon pressure being relieved on said resiliently deformable wall, such wall re-assumes its original configuration thus drawing air into said chamber via said overflow with the liquid in said chamber returning through said channels into the body.

4. The container as claimed in claim 3 wherein said bottom wall, well, socket and tubular extension are an integral assemblage.

References Cited by the Examiner
UNITED STATES PATENTS

| | | | |
|---|---|---|---|
| 1,737,677 | 12/29 | Pennock | 141—59 X |
| 2,822,830 | 2/58 | Grosbois | 141—59 |
| 2,824,668 | 2/58 | Montague et al. | 222—211 X |

L. J. DEMBO, *Primary Examiner.*